United States Patent
Seller

(10) Patent No.: US 9,525,454 B2
(45) Date of Patent: Dec. 20, 2016

(54) WIRELESS COMMUNICATION METHOD

(71) Applicant: Semtech Corporation, Camarillo, CA (US)

(72) Inventor: Olivier Bernard Andre Seller, Sainte Soulle (FR)

(73) Assignee: Semtech Corporation, Camarillo, CA (US)

( * ) Notice: Subject to any disclaimer, the term of this patent is extended or adjusted under 35 U.S.C. 154(b) by 0 days.

(21) Appl. No.: 14/849,209

(22) Filed: Sep. 9, 2015

(65) Prior Publication Data

US 2016/0094268 A1    Mar. 31, 2016

(30) Foreign Application Priority Data

Sep. 30, 2014 (EP) .................................... 14187168

(51) Int. Cl.
*H04B 1/69* (2011.01)
*H04L 27/26* (2006.01)

(52) U.S. Cl.
CPC ............. *H04B 1/69* (2013.01); *H04L 27/2662* (2013.01); *H04B 2001/6912* (2013.01)

(58) Field of Classification Search
USPC ......................................................... 375/139
See application file for complete search history.

(56) References Cited

U.S. PATENT DOCUMENTS

| | | | |
|---|---|---|---|
| 6,940,893 B1 * | 9/2005 | Pinkney | H04B 1/69 370/307 |
| 7,068,704 B1 * | 6/2006 | Orr | G01S 5/02 375/139 |
| 8,611,396 B2 * | 12/2013 | Park | H04B 1/692 375/135 |
| 2011/0298657 A1 * | 12/2011 | Lee | G01S 5/0027 342/357.25 |
| 2014/0269843 A1 * | 9/2014 | Schaffner | H04B 1/69 375/139 |

FOREIGN PATENT DOCUMENTS

| | | |
|---|---|---|
| CN | 102651670 | 8/2012 |
| EP | 2449690 | 5/2012 |
| EP | 2763321 | 8/2014 |
| GB | 2182470 | 5/1987 |
| WO | WO-03027703 | 4/2003 |

OTHER PUBLICATIONS

Kohji Hohkawa et al., "Ultra wide bandwidth SAW matched filter with chirp signal chips", 2004 IEEE International Ultrasonics, Ferroelectrics, and Frequency Control Joint 50th Anniversary Conference, pp. 1922-1925.

* cited by examiner

*Primary Examiner* — Eva Puente
(74) *Attorney, Agent, or Firm* — Blank Rome LLP

(57) ABSTRACT

A method of control of a plurality of end-points by a plurality of base stations, comprises issuing a frame by at least one end-point and sending the frame to at least one base station, sending a response frame from the base station to the end-point upon receiving the frame, the response frame comprising a plurality of downchirps, at least two sequences, each comprising a positive acknowledge and an increase rate and a positive acknowledgement and a decrease rate, and additional control sequences.

10 Claims, 1 Drawing Sheet

WIRELESS COMMUNICATION METHOD

REFERENCE DATA

The present application claims priority from European Patent Application EP14187168 of 30 Sep. 2014, the content whereof are hereby incorporated by reference.

FIELD OF THE INVENTION

The present invention is directed to a method and a frame for control of a plurality of end-points by a plurality of base stations in wireless networks, particularly, but not exclusively, when the throughput of the network system is a limiting factor and the network adopts a synthesized chirp modulation scheme.

BACKGROUND ART

Digital wireless data transmission is used in a wide variety of systems that present a great variability in data rate, transmission range, and power consumption.

Are also known in the art communication systems using digitally synthesized chirp symbols as modulation, and suitable FFT based receivers. European patent application EP2763321 describes, among others, one such modulation method in which the phase of the signal is essentially contiguous, and the chirps are embedded in data frames in in such a way as to allow synchronization between the transmitter and receiver nodes, as well as determining the propagation range between them. This modulation scheme is used in the long-range LoRa™ RF technology of Semtech Corporation, and will be referred simply as 'LoRa' in the following of this document.

There is a need in the art for a digital transmission scheme that partners a long transmission range with low power consumption, and can be realized with simple receivers and transmitters.

Most wireless networks implement a control, from the network, of the endpoints. For instance, in 2G/3G/4G cellular networks, the endpoints need to get their access granted before using the network, and the network controls their transmission speed and transmission power. The control is performed using the same packets as for data, possibly the control is piggybacked in data packets. This allows a reliable transmission of the control information. WiFi networks have a much simpler medium access control. The endpoints implement a "listen before talk" mechanism. In addition, link rate adaptation is performed in an implicit manner: from transmission error statistics of packets with various data rates, the best rate is chosen for most of the packets exchanged. Reliable transmission of the information is achieved thanks to acknowledgement packets. These techniques assume a significant amount of downlink transmission because the networks are either symmetrical for voice operation, or downlink dominated for data access. Further, these techniques increase the required listening time of endpoints. Therefore, what is needed is to provide techniques for network control that exhibit lower amount of downlink transmission, without affecting the required listening of endpoints.

Low throughput networks may not be controlled in the same manner as cellular or even WiFi networks may be fine controlled. This is due to several limitations, which are specific to the fact that, in these networks, endpoints power has to be saved as much as possible and data rates are correspondingly low. The number of packets sent by end-points is typically very limited, possibly down to one packet a day. This makes statistics based adaptation mechanisms impractical, so WiFi based techniques cannot be used and more explicit data rate control is needed. Another possible limitation is the fact that the size of a packet is usually very small, around 20 bytes, or less. If normal data packets of similar size are used for control, they will contribute to most of the bandwidth use. One other possible limitation is that the listening time of endpoints is limited for power saving, the endpoint spending most of the time in an unreceptive low-power state. This is another reason why normal packets, broadcast/multicast packets may not be used for control. Further, in some deployments that use unlicensed bands, the transmit duty cycle is limited. This is not an issue for endpoints, but impacts greatly the time left for control at network base station level.

Despite these limitations, there is still a need for network adaptation. Link rate adaptation, by varying the data rate of the endpoint, reduces to the minimum the time on air for a given data to transmit: this increases network capacity, and more importantly saves battery life. Transmitted power adaptation comes in addition to link rate adaptation, or can be used alone. This power adaptation also saves endpoint power and increases capacity. It reduces potential interferences to other endpoints transmissions that base stations attempt to receive. Endpoints can be slightly mobile, the environment can change over time, or the network can change over time: this motivates the use of adaptation mechanisms. The adaptation mechanisms have to be as simple as possible to meet the constraints of low throughput networks.

Therefore, it is an aim of the present invention to propose means and methods capable of providing suitable control mechanisms, especially in low throughput networks.

DISCLOSURE OF THE INVENTION

The present invention has been conceived and developed aiming to provide solutions to the above stated objective technical needs, as it will be evidenced in the following description.

In accordance with an embodiment of the present invention is proposed a wireless communication method between a plurality of end-points by a plurality of base stations, comprising: issuing a uplink message, by at least one of said plurality of end-points and sending said frame to at least one of said plurality of base stations, said uplink message being modulated according to a chirp spread spectrum format and comprising a series of frequency chirps; sending a response message from said at least one of said plurality of base stations to the at least one of said plurality of end-points upon receiving said uplink message, said response message comprising a sequence of chirps that is not used by the protocol in the uplink messages.

In accordance with further aspects of the present invention, the frequency chirps of the uplink message have a predominant up or down direction, and the chirps of the response message have a direction opposed to the predominant direction of the frequency chirps in the uplink message. In accordance with other embodiments of the invention that are the object of dependent claims, the frequency chirps of the response message are modulated and convey instructions causing the end node to adapt its communication parameters, like for example transmission speed, data rate, spread factor, and so forth, thus implementing a form of network control.

The control mechanism proposed by the present invention is suited to cyclic shift modulated chirp spread spectrum. The control goes from base stations to endpoints, and exhibits a lower duty cycle than that of traditional messages. Further, the control mechanism of the present invention is also able to handle redundant base stations: several base stations can enter the control loop, without coordination. The control mechanism is reliable and permits trading reliability versus time on air in the network parameters.

More detailed explanations regarding these and other aspects and advantages of the invention are provided herewith in connection with the exemplary embodiments of the present invention.

BRIEF DESCRIPTION OF THE DRAWINGS

The above and other aspects, features and advantages of the present invention will become more apparent from the subsequent description thereof, presented in conjunction with the following drawings, wherein.

MODES FOR CARRYING OUT THE INVENTION

Figure 1:
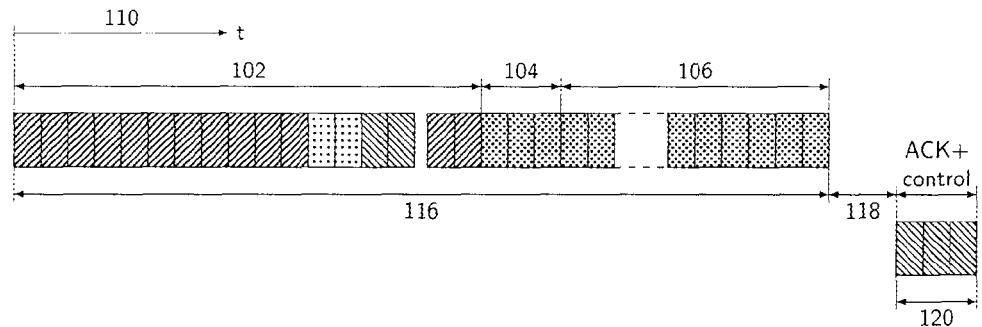
FIG. 1 is a representation of a frame format of a base station operating for control loop, in accordance with the present invention.

The following description of the presently contemplated best mode of practicing the invention is not to be taken in a limiting sense, but is made merely for the purpose of describing the general principles of the invention. The scope of the invention should be determined with reference to the claims.

Reference will now be made to the drawings wherein like numerals refer to like parts throughout.

The reader is directed to European patent applications EP2449690 and EP2763321 (hereby incorporated by reference) for a detailed description of the LoRa modulation scheme. The present description will simply recall the essential points for brevity.

LoRa modulation is based on a succession of frequency chirps whose frequency changes, along a predetermined time interval, from an initial instantaneous frequency value $f_0$ to a final instantaneous frequency $f_1$. It will be assumed, to simplify the description, that all the chirps have the same duration T, although this is not an absolute requirement for the invention.

The chirps can be described by the time profile f(t) of their instantaneous frequency or also by the function $\phi(t)$ defining the phase of the signal as a function of the time. Importantly, LoRa equipment can generate and recognize chirps having a plurality of different profiles, each corresponding to a symbol in a predetermined modulation alphabet. Importantly, the chirps can be either base chirp (also called unmodulated chirps in the following) that have specific and predefined frequency profile, or one out of a set of possible modulated chirps, obtained from base chirps by time-shifting cyclically the base frequency profile.

In a common implementation, the frequency of a base chirps increases linearly from an initial value $f_0=-BW/2$ at, to a final value $f_1=BW/2$ (in the baseband representation), where BW stands for the amount of bandwidth spreading, but descending chirps or other chip profiles are also possible. The phase of the chirps is preferably described by a continuous function $\phi(t)$, that has the same value at the beginning and at the end of a chirp: $\phi(t_0)=\phi(t_1)$ such that the phase of the signal is continuous across symbol boundaries. This inter-symbol phase continuity enables advantageous and elegant FFT demodulation algorithms.

As mentioned above, the interval $BW=f_1-f_0$ together with the chirp period T define the spreading factor of the LoRa transmission, such that the system is capable of operating at different spreading factor. It is important to note that demodulation of LoRa signals requires the knowledge of the spreading factor and, therefore, this parameter is preferably predetermined by the protocol, transmitted to the receiver node, or algorithmically predictable, in order to avoid long searches. It is possible, and indeed preferred, to impose a common value of BW, such that the spreading factor is univocally determine by T alone.

As described herein below, the embodiments of the present invention provide mechanisms and systems for controlling low throughput networks.

As discussed above, some initial solutions for controlling low throughput networks use transmit-only endpoints. While this is a simple control mechanism, it leads to waste of power from the endpoint, and a waste of network capacity. Other solutions use standard packets to acknowledge some transmissions. The downside of this solution resides is the duty cycle limitations. This limitation can be 1%. The uplink network load can be 5 to 20%, assuming simple random access. With "listen before talk", allowing Carrier Sense Medium Access CSMA, this could even go up 50%. And since the uplink frames are very short, while using normal packets, a very limited portion of uplink frames (down to 2%) can be acknowledged or responded to with other control information.

As it will be discussed in detail later, with the methods and means of the present invention, improvements to wireless networks based on LoRa wireless technology may be achieved. The technology uses chirp spread spectrum. For data transmission, chirp symbols are modulated. Ranging and/or localization are an add-on to the network. There are several possible spreading factors, which correspond to different data rates.

Chirps can be synthesized with two opposite directions, namely upchirps with increasing frequency, and downchirps with decreasing frequency). In baseband representation, a downchirp is the complex conjugate of an upchirp. For each spreading factor, two communication channels can be used. One uses mostly chirps with increasing frequency (upchirps), the other uses mostly chirps with decreasing frequency (downchirps). A frame made of upchirps (respectively downchirps), may contains a very limited number of chirps of the opposite polarity for synchronization purposes. In a typical implementation, upchirp frames comprise only two identical unmodulated downchirps in the preamble, among a packet that comprises at least 30 symbols.

The low throughput wireless networks that use LoRa can be redundant, fixed frequencies networks: all endpoints can use any of the available frequencies to any network base stations. It is also possible to use a cellular deployment, where each base station only uses a subset of available frequencies in the network, or a combination of both. Combined to centralized medium access control (such as TDMA), cellular deployment is good to maximize capacity in dense areas.

In the case of low throughput networks, their interest lies in interference mitigation: since many deployments occur in license-exempted bands, networks need to coexist on the same band. Redundant deployments are best for nomadic endpoints, because there is no need for handover. In a LoRa based low throughput network, real time coordination of the base stations at the physical or data-link layer is optional. In particular, the invention allows acknowledgement or control messages from several base stations to coexist.

The present invention proposes in accordance with one of its embodiments a control mechanism that is suited to cyclic shift modulated chirp spread spectrum. The control goes from base stations to endpoints, and exhibits a lower duty cycle than that of traditional messages. It is also able to handle redundant base stations: several base stations can enter the control loop, without coordination. The control mechanism is reliable, with the ability to trade reliability versus time on air in the network parameters.

FIG. 1 is a representation an exchange between an end node and a base station (not represented) that collects data from a plurality of end nodes and ins in charge of adapting the network parameters, for example transmission rates. The exchange is started by an uplink message 116 transmitted by the end node to the base station, which is followed by a downlink message 120 by which the base station acknowledges reception to the end node, and optionally causes the end node to adapts its transmission parameters, in accordance with the present invention.

The present invention is not linked to a specific structure of the uplink message 116. In the following, will be presented, however, a structure essentially as described as in European patent application EP2763621, to which the reader may refer for further information and that is incorporated by reference, with the proviso that this is not an essential feature of the invention and is presented solely as example.

The message 116 starts with a preamble 102 whose aim is to allow detection and synchronization, both in time and frequency, between the sender and the receiver. Further, the message includes a header 104 that contains necessary information for the decoding, and a payload 106, which conveys the information transmitted by the end node to the base station. The axis of reference 110 is time measured at the base station.

The header part 104 of the frame may comprise a data field that includes an indication regarding for what purpose the frame is intended for, and an identification code of the specific device whose response or acknowledgement is needed. Only this specific device having an identification code equal to that specified in the header should respond to the request.

The downlink message preferably consists in a short sequence of chirps that is not used by the protocol in the unlink messages, and can therefore be identification easily with a minimum computational effort.

To make an example, in the frame protocol used by LoRa devices, uplink messages comprises only chirps of the same direction, variously modulated, with the sole exception of two unmodulated adjacent chirps of the opposite direction in the preamble. Therefore, if the upchirp channel is chosen, three or more consecutive downchirps identify unambiguously a downlink message, no matter their modulation state, and inversely. Since this identification does not require a single predetermined modulation of the chirps, modulation can be used to transmit network adaptation messages, as it will be seen in the following.

In a possible embodiment, the uplink message is predominantly composed by upchirps. Upon the reception of a frame 116 from an endpoint, a base station inserts a delay 108 and sends a response 120 consisting in a sequence of three downchirps that is used both to acknowledge the reception of the uplink frame and to control the manner by which the transmitting end node access the network. Preferably, the protocol defines two coded sequences: positive acknowledgement+increase rate, positive acknowledgement+decrease rate, but more sequences can be defined, to control endpoints network access for instance. These sequences can be cyclic shifts of previous ones and/or may require backlink messages comprising more than three symbols.

Preferably, the response symbols are aligned to the frequency and to the sampling timing of the endpoint: this makes the responses more reliable and easier to detect in the endpoint. The response symbols can be aligned in time according to two strategies: either to bring more reliability, or to give endpoints ranging estimates. In addition, the individual symbols of the control sequences can be phase shifted independently from one another and differently for each base station. The interpretation of the response does not require synchronization nor FEC decoding, therefore in addition to short messages, the processing of the response by the endpoint is fast and requires low power. This means the base station compensates for the relative error of oscillators between this specific endpoint and itself. Compensation of sampling drift can be performed through a modification of slope rather than time interpolation. The goal is that the relative reference oscillators difference is transparent to the endpoint, the endpoint does not notice there is a difference in either frequency or sampling timing. The uplink message 116 is followed by a downlink message 120, which will be described in more detail in connection with FIG. 2.

Figure 2:
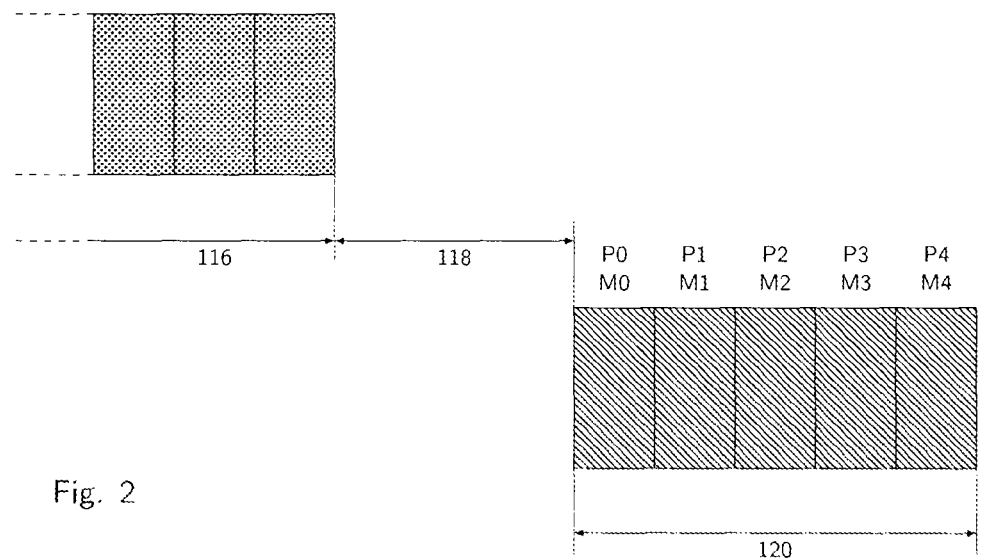
FIG. 2 comprises representation of the response parameters.

FIG. 2 represents schematically the structure of the downlink response, in this case a downlink response comprising four modulated downchirps. As stated before, between the uplink 116 and a downlink 120 there is a delay 118 that may have a predetermined value D0. The downlink 120 comprises, in the represented example, five downchirps characterized via modulation values M0, M1, M2, and M4 and phase offsets of symbols, P0, P1, . . . P4, but other structures are also possible.

Before giving example of possible modulation values M0, M1, M2, etc. it is important to note a property of cyclic shift modulation: a small time shift is equivalent to a modulation value offset. For instance, a time shift of 1 sample (i.e. 1 chip), is equivalent to a modulation value delta of 1. Then, propagation delay, when not compensated, is converted to a modulation value offset. Usual deployments will use cell radiuses of several kilometers in the countryside, which translates into a maximum of around 20 samples delay (500 KHz bandwidth, 12Km), and lower than 8 for most cases.

Preferably, succession of identical symbols or of symbols separated by less than three modulation units should not be used in the downlink 120. In this manner, the end nodes can discriminate easily and reliably a downlink message against downchirp sections of uplink transmissions. Another minor constraint is that small modulation values (close to 0, or close to SF-1) are more reliable than high modulation values (close to SF/2).

The tables provided below illustrate various examples for modulation values, for various number of messages and cases regarding the propagation delay.

TABLE 1 modulation values example, 2 messages, 7 samples maximum propagation delay.

| | M0 | M1 | M2 | M3 | M4 |
|---|---|---|---|---|---|
| ACK & raise | SF-8 | 0 | SF-8 | 0 | SF-8 |
| ACK & lower | 0 | SF-8 | 0 | SF-8 | 0 |

TABLE 2 modulation values example, 2 messages, base station compensated propagation delay.

|  | M0 | M1 | M2 | M3 | M4 |
|---|---|---|---|---|---|
| ACK & raise | SF-2 | 2 | SF-2 | 2 | SF-2 |
| ACK & lower | 2 | SF-2 | 2 | SF-2 | 2 |

TABLE 3 modulation values example, 5 messages, base station compensated propagation delay.

|  | M0 | M1 | M2 | M3 | M4 |
|---|---|---|---|---|---|
| ACK & raise, delay slot | SF-2 | 2 | SF-2 | 2 | SF-2 |
| ACK & raise, advance slot | SF-1 | 3 | SF-1 | 3 | SF-1 |
| ACK & keep | SF-3 | 1 | SF-3 | 1 | SF-3 |
| ACK & lower, delay slot | 2 | SF-2 | 2 | SF-2 | 2 |
| ACK & lower, advance slot | 3 | SF-1 | 3 | SF-1 | 3 |

In a first mode, the delay D0 inserted by the base station between the uplink and the downlink is an integer number of symbols. For small spreading factors, it can be 2 symbols to let time for TX/RX switch, and for higher spreading factors it can be a single one. The endpoint, which receives the control, is then able to estimate the propagation time (actually, twice the propagation time) between the base station and itself: the higher the delay, the higher the apparent modulation values that are received by the endpoint. This gives to the endpoint a rough estimated distance.

In a second mode, D0 is reduced by an estimated propagation time between base station and endpoint. This estimated propagation time can come out of a ranging sequence, for instance. Thanks to this compensation, the control symbols arrive aligned in time: the apparent modulation values received by endpoint cannot differ from intended modulation value transmitted by base station. This makes the control operation more reliable.

Depending on the mode for D0, the endpoint needs to search for various numbers of potential messages. Endpoint needs to search for the number of messages multiplied by the number of possible sample delays introduced by propagation. With propagation compensation, this reduces to the number of control messages. The size of this searching space is exemplarily between 2 and 20. This is important for evaluating the success probability of a message.

Another parameter that influences error probability of a message is the number of symbols in a sequence: the longer the sequence, the better for reliability. Two kinds of errors occur, in a similar fashion as in detection: a control message can be missed, this is a "missed detection", or a control message can be invented, this is "false alarm". We aim at very low false alarm rates, and very low missed detection rates.

The additive white Gaussian noise (AWGN) is a basic noise model used in Information theory to mimic the effect of many random processes that occur in nature by adding to the ideal signal white noise with a constant spectral density (expressed as watts per hertz of bandwidth) and a Gaussian distribution of amplitude. In its simplification, this model provides simple and tractable mathematical models that are useful for gaining insight into the behavior of a system.

Under the assumption of an AWGN channel for 32 messages, 8 dB signal to noise ratio (SNR) post de-spreading, and a threshold of 40, the downlink method proposed by the present invention a false alarm rate (wrong control received) as low as 0.05%, while the missed detects (good control not received) around 1%, with an acknowledgement message of five symbols. These are fairly pessimistic assumptions as 8 dB is the worst case for signal to noise ratio, and 32 messages is also a worst case since 32 is the product of the number of potential messages (4) times the number of possible delays due to propagation (8).

Under more realistic assumptions of 4 messages, 12 dB SNR, and time synchronization derived by range estimate, the AWGN approximation yields a negligible false alarm rate (around 1E-6 per message) and 0.1% of missed detects. Furthermore, these values are obtained with an acknowledgement message of three symbols only. Overall, this proves that the designed mechanism is suitable for fast and reliable rate/power/network control.

Preferably, the symbols 120 are individually characterized, in addition to their modulation values, by phase offsets that are noted P0, P1, P2, etc. The phase offsets may be set as random values for each base station. This is useful in the case in which a plurality of base stations transmit reply packets with the same sequence at the same time. The phase shifts mitigate interference between these concurrent transmissions, as symbols with different phase shifts do not interfere with each other. Should a destructive interference occur on one symbol, the other ones would nevertheless be detectable. Instead of being randomly set, the phase shifts may be purposely assigned according to a plan, for example in such a manner that nearby base station always use different phase shifts, or by any suitable algorithm. The phase offsets need not be applied to all the symbols in the control sequence, but they are preferably applied to all symbols except the first one.

In addition to the exemplary embodiments of the present invention discussed above, further embodiments for the present invention are contemplated, as described below:

In accordance with the present invention, the base stations can shuffle their response time alignment, or equivalently offset their modulation values sequences. The endpoint can no longer do ranging, but the collisions probability vanishes.

In addition to controlling the messages, in accordance with the present invention further cyclic shifts of the same messages may be used to identify base stations. Time offsets (or cyclic shifts) may set randomly for each base station or planned in the network, and they may be aligned with frequency use. Assuming for example that one or two channels are available on every base station, and others are not (to optimize capacity, or to avoid interfered bands). This way the response on the mobile channel tells which other frequency can be used. There is no need to listen to the channel for a long time to access the network. Each base station (BTS) then has an offset. The amount of offset is greater than the maximum time of flight in the network. The time offsets need not be applied the control sequence, but they are preferably applied to all symbols in the same amount.

The time alignment/number of messages strategy can depend on the spreading factor. For instance, for the highest spreading factor, the base stations may signal their ID/nonmobile frequencies using the delay, which also allows coarse ranging. Then for all other spreading factors, the base stations adjust their response in time to align to symbol boundaries of endpoint, plus planned delay of an integer amount of chips: this allows best concurrent control of endpoints.

The number of symbols can be reduced for certain endpoints by the base station. When the signal to noise ratio allows enough margin, for instance 2 symbols can be sent instead of 4. This reduces the transmit duty cycle of the base station, but may still give accurate performance of the loop control under favorable circumstances. The endpoint needs not to know the reduced number of symbols, and can use the same algorithms to receive the control messages.

On the endpoint side, it is possible to average over several control messages, to adjust the window in time. This way, the received symbols are well located on single modulation values.

The endpoint can be programmed to interpret the downlink messages in any appropriate manner. The absence of an acknowledgement can be interpreted as a transmission error, and trigger a retransmission of the uplink frame. The acknowledgement downlink can be generated as a matter of course for all packets or, preferably, for selected packets only identified by a suitable flag bit in the uplink's header. Preferably, the end notes listen for a downlink packet during a stated time interval after each uplink transmission, or only after those for which an acknowledgement has been explicitly requested. Command to increase and/or decrease the transmission rate are preferably honored with priority.

To summarize, the present invention is directed to at least to a method of control of a plurality of end-points by a plurality of base stations, comprising: issuing a frame by at least one of said plurality of end-points and sending said frame to at least one of said plurality of base stations, sending a response frame from said at least one of said plurality of base stations to the at least one of said plurality of end-points upon receiving said frame, wherein said response frame comprising: a plurality of downchirps, at least two sequences, each comprising a positive acknowledge and an increase rate and a positive acknowledgement and a decrease rate, and additional control sequences.

The two sequences may be a cyclic shift of sequences previously issued by at least one of said plurality of base stations. The response frame is aligned to the frequency of at least one of said plurality of the end points. The response frame is aligned in sample timing with at least one of said plurality of end points. The control sequences comprise individual symbols. The individual symbols are phase shifted independently and differently for each one of said base stations of said plurality of base stations. The individual symbols are aligned in base station time. The individual symbols are aligned in end point time. The control sequences comprise random phase offsets.

The invention claimed is:

1. A method of controlling a wireless communication network having a plurality of end-points and a plurality of base stations, comprising:

issuing a uplink message, by at least one of said plurality of end-points and sending said message through the wireless communication network to at least one of said plurality of base stations, said uplink message being modulated according to a chirp spread spectrum format and comprising a series of frequency chirps;

sending a response message through the wireless communication network from said at least one of said plurality of base stations to the at least one of said plurality of end-points upon receiving said uplink message;

said response message comprising a sequence of chirps that is not used in the uplink message, wherein the chirps of said sequence of chirps of the response message are modulated and convey instructions causing the at least one of said plurality of end-points to adapt its communication parameters.

2. The method of claim 1, wherein the frequency chirps of the uplink message have a predominant up or down direction, and the chirps of the response message have a direction opposed to the predominant direction of the frequency chirps in the uplink message.

3. The method of claim 1, wherein the at least one of said plurality of end-points awaits the response message after the issuing of the uplink message and interprets the response message as an acknowledgement of reception of the uplink message.

4. The method of claim 1, wherein said response message causes the at least one of said plurality of end-points to increase or decrease its transmission rate and/or bandwidth and/or spread factor.

5. The method of claim 1, wherein the response message is aligned to the frequency of at least one of said plurality of the end-points.

6. The method of claim 1, wherein the response message is aligned in sample timing with at least one of said plurality of end-points.

7. The method of claim 1, wherein the chirps in said sequence of chirps of the response message are aligned in base station time.

8. The method of claim 1, wherein at least part of the chirps in said sequence of chirps are characterized by random phase offset or by a combination of phase offsets individually assigned to base stations.

9. The method of claim 1, wherein at least part of the chirps in said sequence of chirps of the response message are characterized by a common time offset randomly chosen by the base station or individually assigned to base stations.

10. The method of claim 1, wherein said end-points transmit and receive on predetermined frequency channels.

* * * * *